(No Model.)
E. R. JONES.
CORN CULTIVATOR.
No. 529,915. Patented Nov. 27, 1894.
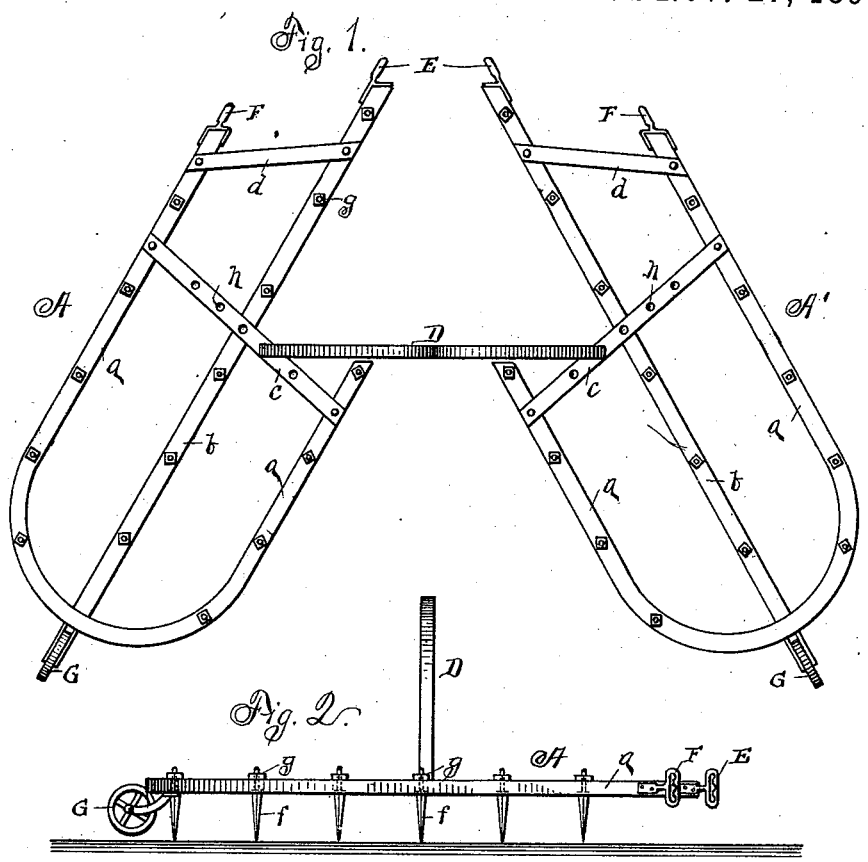
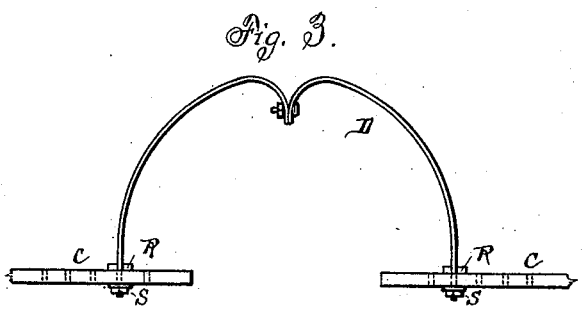
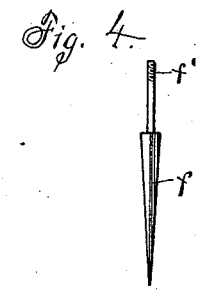
WITNESSES
INVENTOR
E. R. Jones
E. W. Anderson
his Attorney

UNITED STATES PATENT OFFICE.

EDWARD R. JONES, OF ST. LAWRENCE, SOUTH DAKOTA.

CORN-CULTIVATOR.

SPECIFICATION forming part of Letters Patent No. 529,915, dated November 27, 1894.

Application filed January 31, 1894. Serial No. 498,550. (No model.)

*To all whom it may concern:*

Be it known that I, EDWARD R. JONES, a citizen of the United States, and a resident of St. Lawrence, in the county of Hand and State of South Dakota, have invented certain new and useful Improvements in Corn-Cultivators; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view of the cultivator. Fig. 2 is a side elevation of same. Fig. 3 is a detail view of the arch and cross bars the latter partly broken away and Fig. 4 is a detail view of the tooth.

This invention has relation to cultivators for corn and other crops, and it consists in the novel construction and combination of parts, all as hereinafter described and pointed out in the appended claim.

The object of the invention is the provision of a cultivator simple in its construction, effective in its operation, and possessing means whereby it may be readily adjusted to meet different requirements, all as will hereinafter more fully appear.

Referring to the accompanying drawings illustrating the invention, the letters A, A' designate the two frames of which the cultivator mainly consists, said frames comprising each the lateral bars $a$, $a$, connected at their rear end, (the connection consisting either of a straight, or as shown, a curved bar,) a central bar $b$ parallel with the said lateral bars, a cross bar $c$, and a shorter cross-bar $d$. The outer lateral bar of each frame is longer than the inner, although somewhat shorter than the central bar $b$, and the shorter cross-bar $d$ forms the connection between the forward end portions of the said outer bar and the central bar. Said bars $a$, $a$, $b$, and $c$, in each frame are provided with a series of teeth $f$. The lower portion of each of said teeth is preferably of diamond, or lozenge, shape in cross-section, while the upper end portion which engages the frame bar is cylindrical, and is threaded at $f'$ to receive a nut $g$, the upper end of the diamond portion being let into the under side of the frame to prevent turning. Other well known and suitable forms of teeth may however be used.

The two frames A and A' are placed obliquely to each other, with their forward ends converging to a greater or less degree, and are connected together by an arch D whose end portions are pivotally secured in the cross-bars $c$ $c$. This connection permits the two frames to be swung into different relations to each other as may be desired. The connection of the arch with the frames is arranged to be made at different points, as indicated at $h$, $h$ so that the frames may be adjusted to a greater or less distance from each other. On the forward end of each of the longitudinal center bars $c$ is a clevis E to which the draft attachment is connected, the cultivator being usually connected to a sulky or other two-wheeled vehicle. I also provide clevises F at the forward portions of the outer lateral bars $a$, $a$, the draft connection being made at this point when it is desired to throw the forward portions of the frames closer to each other.

At the rear portion of each frame is a swiveled wheel G, so adjusted that when the front end of the frame is raised from the ground, the wheel will strike the ground, and enable the frames to be swung around in turning, and thereby prevent the teeth from dragging.

The frame bars may be of wood, or of hollow metal flattened at the points where they join each other.

In operation I connect draft chains to the clevises E, E, or F, F, according to the adjustment of the two frames, the connections being usually made at E, E, when the frames are spread, and at F, F, when they are closed. The chains are then made fast to a sulky or to a singletree or doubletree in the usual manner. The frame straddles one row, cultivating to each side thereof, so that it is necessary to straddle every other row only for the whole ground to be thoroughly gone over with, the work being facilitated to this extent. The several wheels G, as before stated, do not ordinarily travel on the ground, but when the forward portions of the frames are raised, they come in contact with the ground, thus facilitating the operation of turning the cultivator around. The ground moreover, is left even, avoiding furrows or ditches, as well as injury to the roots of the crops.

The arch D is usually made in two sections joined at the center by a bolt $p$, which permits each section to work forward and back, but to hold solidly against lateral movement. The end portions of each of the arch sections are usually slotted to receive a key R above the frame, there being a nut and washer S at the under side. The key may be removed to permit the frames to be raised for cleaning.

The jointed construction of the arch D is of especial value in that should one frame meet with an obstruction, there is sufficient play on the bolt $f$ to take up the movement of the other frame, and thus prevent the wrench on the parts which would otherwise occur.

Having described my invention, what I believe to be novel, and desire to secure by Letters Patent, is—

The herein described cultivator, comprising the frames A, A', consisting each of two lateral bars, one of which is longer than the other, a center bar longer than either of said lateral bars, cross-bars connecting said lateral and center bars, teeth carried by the said bars, an arch connecting the frames A, A' about midway of their length and having its ends adjustably pivoted in said frames, said arch being formed in two sections loosely connected, a swiveled wheel G at the rear portion of each of said frames, and draft clevises at the forward portion of said frames, substantially as specified.

In testimony whereof I affix my signature in presence of two witnesses.

EDWARD R. JONES.

Witnesses:
W. H. SMITH,
T. O. TELLER.